United States Patent [19]

Shu

[11] Patent Number: 5,119,690

[45] Date of Patent: Jun. 9, 1992

[54] HANDLEBAR ASSEMBLY FOR CYCLES

[76] Inventor: Hung-Chern Shu, No. 4, Sec. 2, Tung Hsin Rd., Taichung, Taiwan

[21] Appl. No.: 750,190

[22] Filed: Aug. 26, 1991

[51] Int. Cl.⁵ .......................................... B62K 21/14
[52] U.S. Cl. ................................... 74/551.1; 403/205; 403/191; 403/310; 403/312
[58] Field of Search ....................... 74/543, 548, 551.1, 74/551.2, 551.3, 551.6, 551.8, 551.9; 403/191, 205, 230, 234, 236, 247, 256, 309, 310, 312

[56] References Cited

U.S. PATENT DOCUMENTS

| 578,180 | 3/1897 | Wood | 74/543 |
| 1,261,213 | 4/1918 | Clay | 403/205 X |
| 1,808,769 | 6/1931 | Dibner | 403/191 X |
| 4,939,950 | 8/1990 | Girvin | 74/551.2 |

FOREIGN PATENT DOCUMENTS

| 801298 | 1/1951 | Fed. Rep. of Germany | 403/312 |
| 2453771 | 7/1980 | France | 74/551.1 |
| 282063 | 8/1931 | Italy | 403/191 |
| 475530 | 11/1952 | Italy | 403/312 |
| 15959 | of 1908 | United Kingdom | 74/551.1 |
| 803024 | 10/1958 | United Kingdom | 74/551.1 |

Primary Examiner—Richard Lorence
Assistant Examiner—William O. Trousdell
Attorney, Agent, or Firm—Marger, Johnson, McCollom & Stolowitz

[57] ABSTRACT

A handlebar structure of a cycle including a stem having a shank extended forward, a notch formed in the front end of the shank, a coupler coupling a handlebar to the shank and including two members each including two elements formed integral with each other, the elements of the members forming two cylindrical spaces for receiving the shank and a middle portion of the handlebar when the members are fixed together, and a tongue formed in one of the members and engageable with the notch of the shank so that the coupler can be prevented from rotating relative to the shank.

5 Claims, 3 Drawing Sheets

HANDLEBAR ASSEMBLY FOR CYCLES

BACKGROUND OF THE INVENTION

1. Field of the Invention

The present invention relates to a handlebar, and more particularly to a handlebar assembly for cycles.

2. Description of the Prior Art

One type of handlebar assembly is disclosed in U.S. Pat. No. 4,939,950 to Girvin, filed Oct. 24, 1988, entitled "HANDLEBAR ASSEMBLY FOR CYCLES". In this assembly, the handlebar element 24 includes a tubular main portion 60 and a pair of gripping portions 62. The tubular main portion 60 which is generally galvanized is received and secured in the tubular front sleeve 44 by such as bolts and nuts.

Since the tubular front sleeve 44 can not be wide opened, the tubular main portion 60 is forced into the tubular front sleeve 44 from one end thereof such that the tubular main portion 60 can be received and secured in the tubular front sleeve 44. This is inconvenient. In addition, the galvanized surface of the tubular main portion 60 will be scratched or hurt when it is forced into the tubular front sleeve 44 such that the tubular main portion 60 is apt to be rusted. Furthermore, the gripping portions 62 can be fixed in place only after the tubular main portion 60 has been forced into the tubular front sleeve 44. This further causes inconvenience for assembling purposes. The gripping portions 62 of the handlebar will become loose after long term of usage.

The present invention has arisen to mitigate and/or obviate the afore-described disadvantages of the conventional handlebar assembly.

SUMMARY OF THE INVENTION

The primary objective of the present invention is to provide a handlebar assembly which can be easily assembled.

In accordance with one aspect of the invention, there is provided a handlebar structure of a cycle including a stem having a shank extended forward, a notch formed in the front end of the shank, a handlebar, a coupler coupling the handlebar to the shank and including two members each including two elements formed integral with each other, each of the members including a pair of lugs and an ear so that the members can be fixed together, the elements of the members forming two cylindrical spaces for receiving the shank and a middle portion of the handlebar when the members are fixed together, and a tongue formed in one of the members and engageable with the notch of the shank so that the coupler can be prevented from rotating relative to the shank.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
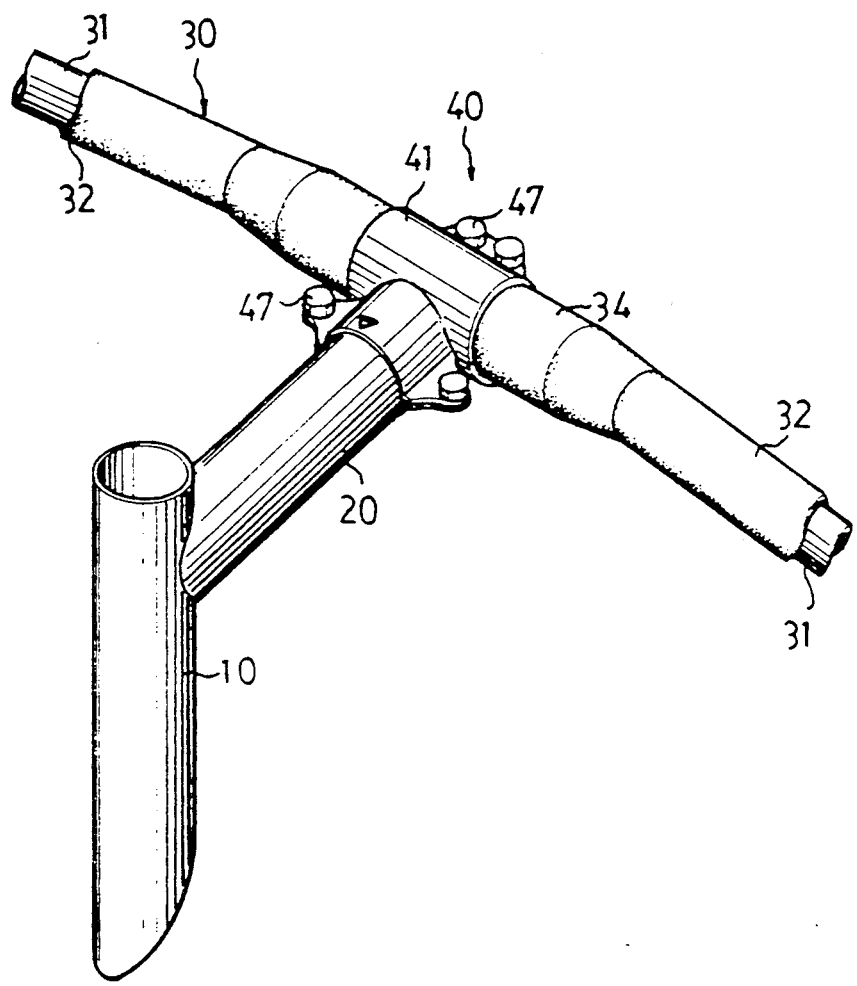
FIG. 1 is a perspective view of a handlebar assembly in accordance with the present invention.
Figure 2:
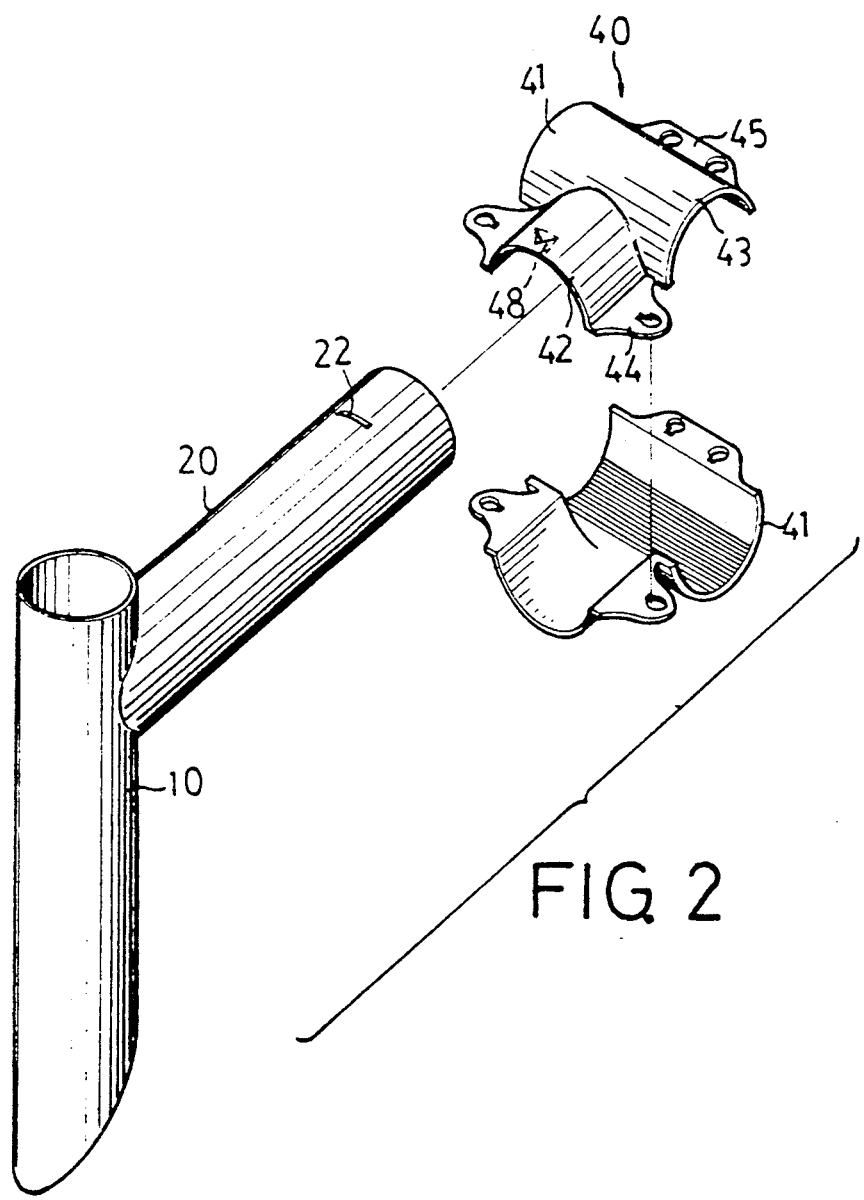
FIG. 2 is a partial exploded view of the handlebar assembly.
Figure 3:
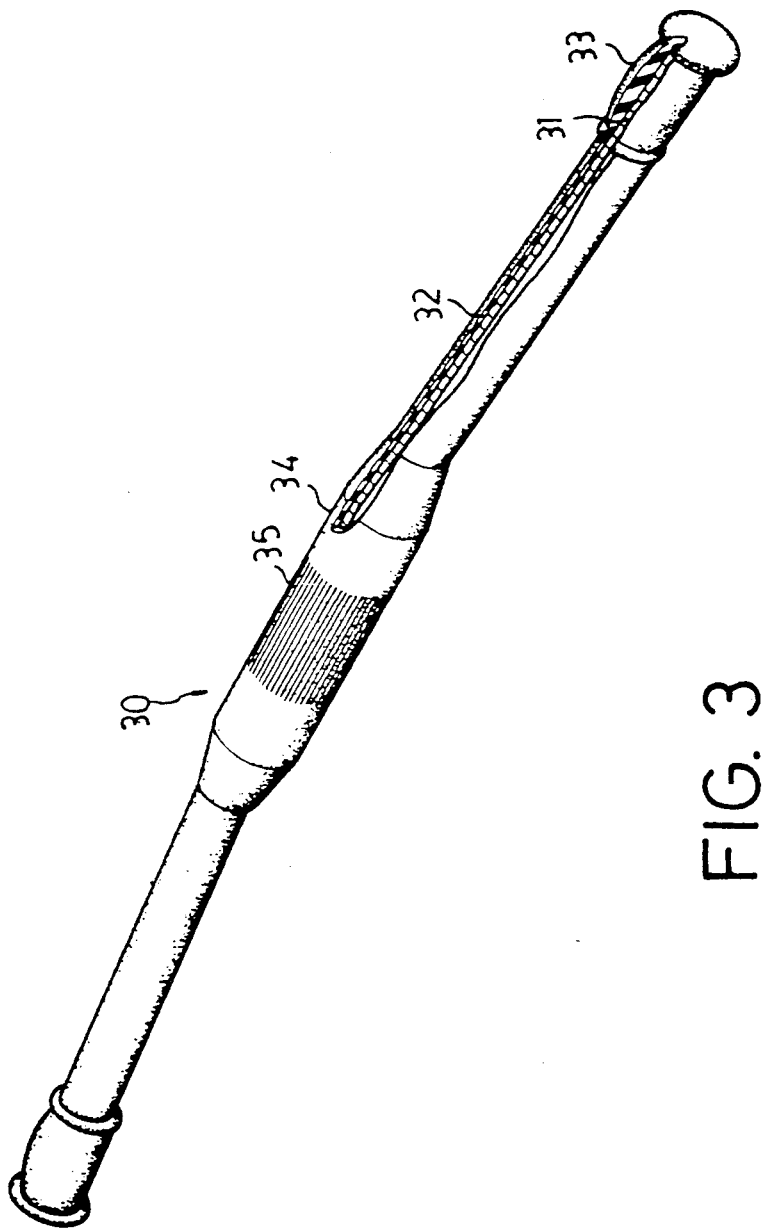
FIG. 3 is a perspective view of the handlebar.

Referring to the drawings, a handlebar assembly in accordance with the present invention comprises generally a stem 10 having a shank 20 extended forward therefrom; and a handlebar 30 laterally fixed to the front end of the shank 20 by a coupler 40. A notch 22 is formed in the front portion of the upper portion of the shank 20. The handlebar 30 includes a tubular bar 31 having a shell 32 formed therearound by such as molding processes. A pair of grips 33 are formed integral on the end portions of the shell 32 such that the grips 33 will not become loose. The middle portion 34 of the shell 32 preferably has an enlarged outer diameter as compared with the other portion of the shell 32 and has knurling 35 formed therein.

The coupler 40 includes a pair of members 41 each including a first element 42 and a second element 43 fixed integrally and perpendicularly with each other. A pair of lugs 44 extend outward from the end portions of each of the first element 42, and an ear 45 extends forward from each of the second element 43 so that the members 41 can be fixed together by such as bolts and nuts 47. When the members 41 are fixed together, the first elements 42 and the second elements 43 form two cylindrical spaces which are perpendicular with each other for receiving the shank 20 and the middle portion 34 of the handlebar 30 respectively so that the handlebar 30 can be fixed to the shank 20. A tongue 48 extends downward from one of the first elements 42 and is engageable within the notch 22 of the shank 20 so that the coupler 40 can be prevented from rotating relative to the shank 20.

Similarly, the stem 10 and the shank 20 can be covered with a shell which is made of plastic materials or the like such that the stem 10 and the shank 20 can be prevented from rusting problems.

Accordingly, the handlebar assembly in accordance with the present invention has the following advantages:

(a) the handlebar 30 can be easily coupled to the shank 20 by the coupler 40, (b) the bar 31 is protected by the shell 32 so that the bar 31 will not be scratched or hurt, (c) the bar 31 need not be galvanized, the galvanizing processes may cause pollution problems, (d) the grips 33 can be fixed integral with the shell 32 so that the grips 33 will not become loose, and (e) the grips 33 will not affect the assembling processes of the handlebar assembly.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A handlebar assembly comprising a stem having a shank extended forward therefrom, said shank including a front end, a first engaging means formed in said front end of said shank, a handlebar, a coupler provided for coupling said handlebar to said shank and comprising two members each including a first element and a second element formed integral with each other, each of said first elements including a pair of lugs extended outward therefrom, each of said second elements including an ear so that said members can be fixed together, said first elements and said second elements forming two cylindrical spaces for receiving said shank and a middle portion of said handlebar respectively when said members are fixed together, and a second engaging means formed in one of said first elements and engageable with said first engaging means of said shank so that said coupler can be prevented from rotating relative to said shank.

2. A handlebar assembly according to claim 1, wherein said handlebar includes a tubular bar covered with a shell so that said tubular bar can be protected from rusting problems, said shell includes a pair of grips formed integral on both end portions thereof so that said grips will not become loose.

3. A handlebar assembly according to claim 2, wherein said shell includes a middle portion which has an enlarged diameter as compared with the other portion thereof, said middle portion of said shell is clamped between said second elements of said members when said members are fixed together.

4. A handlebar assembly according to claim 3, wherein said middle portion of said shell includes knurling formed thereon.

5. A handlebar assembly according to claim 1, wherein said first engaging means is a notch formed in said shank and said second engaging means is a tongue extended from one of said first elements of said coupler and is engageable in said notch of said shank.

* * * * *